United States Patent
Koola et al.

(10) Patent No.: US 8,207,622 B2
(45) Date of Patent: Jun. 26, 2012

(54) INERTIAL MASS POWER GENERATION

(75) Inventors: Paul M. Koola, College Station, TX (US); Richard J. Mayer, College Station, TX (US)

(73) Assignee: Knowledge Based Systems, Inc., College Station, TX (US)

( * ) Notice: Subject to any disclaimer, the term of this patent is extended or adjusted under 35 U.S.C. 154(b) by 614 days.

(21) Appl. No.: 12/364,302

(22) Filed: Feb. 2, 2009

(65) Prior Publication Data

US 2009/0206608 A1 Aug. 20, 2009

Related U.S. Application Data

(60) Provisional application No. 61/030,071, filed on Feb. 20, 2008.

(51) Int. Cl.
*F03B 13/10* (2006.01)
(52) U.S. Cl. .............................. 290/42; 290/53
(58) Field of Classification Search .................. 290/42, 290/53, 1 R; 416/7; 60/398, 495–502; 417/330, 417/331; 405/75, 76
See application file for complete search history.

(56) References Cited

U.S. PATENT DOCUMENTS

| | | | | |
|---|---|---|---|---|
| 3,870,893 A | * | 3/1975 | Mattera | 290/53 |
| 4,271,668 A | * | 6/1981 | McCormick | 60/398 |
| 4,392,061 A | * | 7/1983 | Dubois et al. | 290/53 |
| 4,441,316 A | * | 4/1984 | Moody | 60/398 |
| 4,622,473 A | * | 11/1986 | Curry | 290/53 |
| 4,858,434 A | * | 8/1989 | Masuda | 60/398 |
| 4,996,840 A | * | 3/1991 | Marx | 60/507 |
| 5,016,998 A | * | 5/1991 | Butler et al. | 359/847 |
| 6,216,455 B1 | * | 4/2001 | Doleh et al. | 60/398 |
| 6,772,592 B2 | * | 8/2004 | Gerber et al. | 60/495 |
| 6,933,623 B2 | * | 8/2005 | Carroll et al. | 290/42 |
| 2007/0284885 A1 | * | 12/2007 | Menges | 290/55 |
| 2008/0277196 A1 | * | 11/2008 | Rapp et al. | 181/157 |
| 2009/0152990 A1 | * | 6/2009 | Brown et al. | 310/339 |

OTHER PUBLICATIONS

"National Data Buoy Center, National Oceanic and Atmospheric Administration (NOAA)", [online]. [retrieved Dec. 16, 2008}. Retrieved from the Internet: <URL: http://ndbc.noaa.gov/>, (last modified: Oct. 23, 2008), 1 pg.

"The Art of the Possible Communications at Speed and Depth", [online]. [retrieved Dec. 16, 2008]. Retrieved from the Internet: <URL: http://www.navy.mil/navydata/_cno/n87/usw/issue_30/art.html>, 6 pgs.

"Wave Energy", *The Dept of Energy's (UK) R&D Programme 1974-198, ETSU R26* ETSU,(Mar.., 1985), 129 pgs.

Ambli, N., et al., "The Kvaerner Multiresonant OWC", *The Second Internanational Symposium on Wave Energy Ultilization*, Trondheim, Norway, (Jun. 1982), 275-295.

Duckers, L. J., et al., "Reinforced Rubber membranes for the Calm Wave Energy Converter"*The Proceedings of the Ninth (1999) International Offshore and Polar Conference*, Brest, France, (1999), 174-179.

(Continued)

*Primary Examiner* — Tho D Ta

(74) *Attorney, Agent, or Firm* — Schwegman, Lundberg & Woessner, P.A.

(57) ABSTRACT

Apparatus and systems, as well as methods and articles of manufacture, may operate to receive oscillatory motion at an inertial mass to impart motion to a fluid, rotate a turbine or vibrate a beam using the motion imparted to the fluid, and generate power using a generator mechanically coupled to the turbine or beam. Other embodiments are described and claimed.

27 Claims, 9 Drawing Sheets

OTHER PUBLICATIONS

Glendenning, I., "Energy from the Waves", *Proceedings, Oceanology International '78 Technical Session L—Energy from the Seas*, (1978), 20-32.

Kansal, A., et al., "Harvesting Aware Power Management for Sensor Networks", *2006 43rd ACM/IEEE Design Automation Conference*, (2006), 651-656.

Meir, R., "The Development of the Oscillating the Water Column", *Proceedings of the Wave Energy Conference*, London, (1978) 35-44.

Newham, M., "Norway Starts Up World's First Commercial Wave Power Plants", *Solar Energy Intelliegence Report*, (Jan. 21, 1986), p. 24.

Ross, David, *Energy from the Waves*, (2nd Edition, Pergamon Press, New York, NY), (1979), 148 pgs.

Shaw, Ronald, *Wave Energy—A Design Challenge*, (Ellis Horwood, Limited, Sussex, Engliand), (1982), 202 pgs.

Taylor, R. J., "Wave Energy: the Influence of Maintenance / Repair Requirements", *Second International Symposium on Wave and Tidal Energy*, University of Cambridge, England, (1981), 99-104.

Wolley, M. V., et al., "Mass Production of Concrete Wave Energy Devices", *The Structural Engineer, 59A,2*, (1981), 57-68.

\* cited by examiner

INERTIAL MASS POWER GENERATION

RELATED APPLICATION

This application claims the priority benefit of U.S. Provisional Application Ser. No. 61/030,071 filed Feb. 20, 2008, the content of which is incorporated herein by reference in its entirety.

BACKGROUND INFORMATION

Solar energy, nuclear power, chemical batteries, and other mechanisms for providing energy present problems with respect to the area required, maintenance, reliability, and other aspects of their operation.

DETAILED DESCRIPTION

Wave energy harvesting offers a promising alternative to solving the sustainability limitations arising from battery size constraints in buoy sensor networks. Thus, some embodiments of the invention include a robust, low-maintenance Parasitic Power Pack (P3) that can be modularly inserted into buoy systems deployed in distributed sensor networks, where the buoys behave hydrodynamically as point absorbers. In this way, the unique design of the P3 operates to convert low frequency, large amplitude wave oscillations into useful power.

While much of the discussion herein is directed to embodiments realized in the P3 format, as used in buoys, it should be understood that this has been done as a matter of convenience and clarity, and thus, the various embodiments are not to be so limited. Thus, it should be noted that this concept is scalable to support any floating device, including sensors and other power consuming devices distributed on ships and other floating platforms, and hence, can be used in both commercial and military applications.

The P3 can be modularly integrated into buoys in much the same way as replacing a battery pack. In various embodiments, this mechanism can provide the following innovative features:

- built-in inertial platform that supports free-floating devices
- substantially steady power output using a randomly fluctuating input
- wave power source and built-in energy storage
- operation that is substantially independent of wave direction
- modular form-factor design that can serve as a direct battery replacement
- low-maintenance, robust design capable of exceeding sea state 5 operations
- relatively low life cycle cost The P3 absorbs wave induced oscillations of the buoy and uses an inertial spring mass damper system to convert the oscillations into electric power. Coupled with an ultracapacitor or other energy storage element, the P3 can deliver substantially steady power from a randomly fluctuating input source. The design is scalable to take advantage of wave power for different applications in the wave environment. For example, even though some buoys are not hydrodynamically designed for wave power extraction, the average buoy motion can still be sufficient to generate power for buoy operation when coupled to the P3.

Most floating wave power devices are tethered to the ocean bottom and have a reference frame against which the oscillations are absorbed; the P3 can work with a free-floating device aided by a built-in inertial system. Some existing wave power designs for free floating devices have used gyroscopes as an inertial reference, but this is avoided in the P3 design, as buoys are often rapidly released, potentially damaging such delicate designs.

Figure 1:
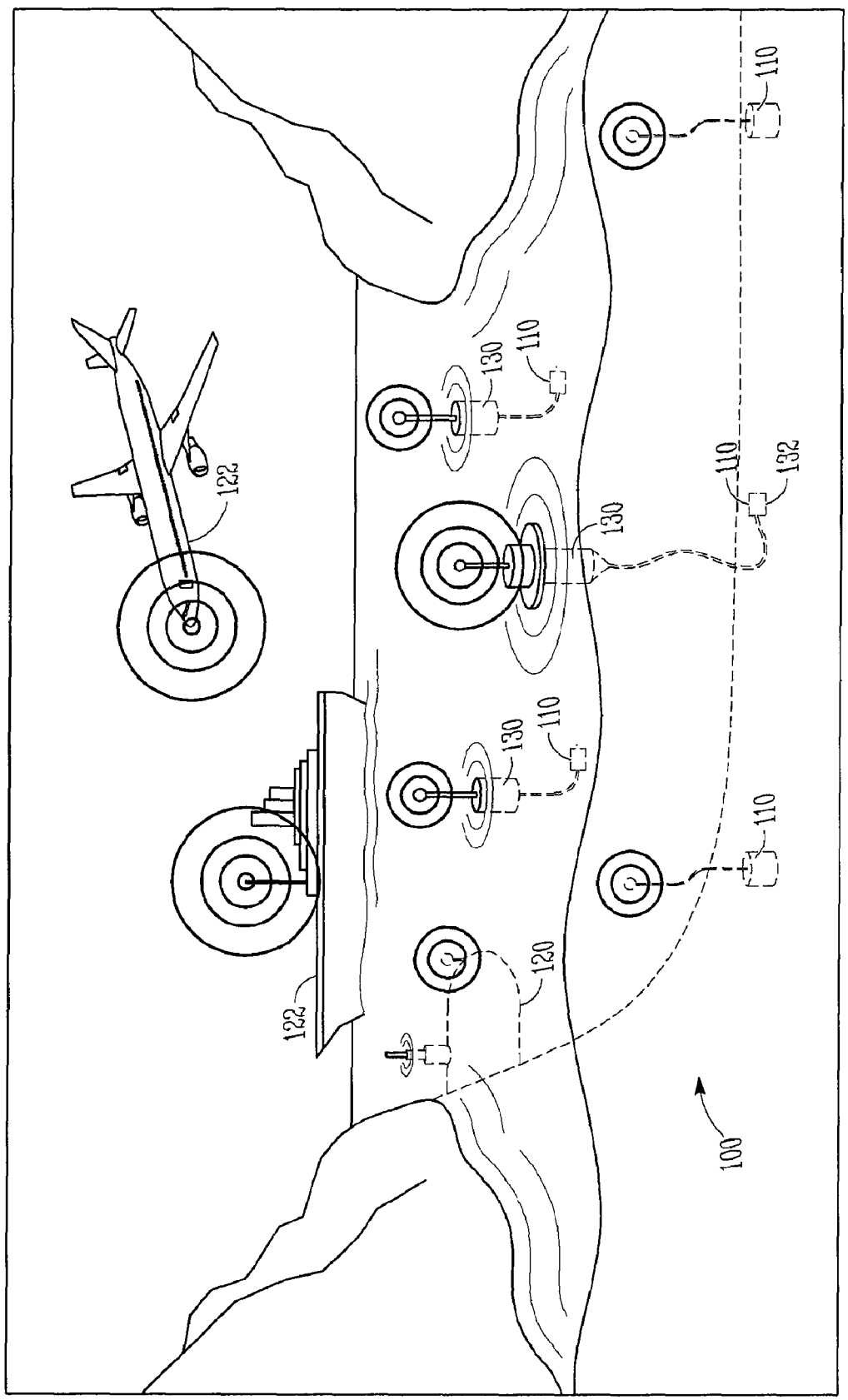
FIG. 1 illustrates a network of distributed sensors according to various embodiments of the invention.

FIG. 1 illustrates a network 100 of distributed sensors 110 according to various embodiments of the invention. As an illustration of the possible application of this device, FIG. 1 shows the concept of using distributed sensors 110 deployed in the ocean to show how undersea communications networks 100 enable communications among submerged submarines 120, other assets 122, and undersea sensors 110, thereby multiplying the effectiveness of the submarine force and hence maintaining undersea dominance.

Many buoys currently in use have at least a basic radio communication capability, such as emergency communications, and radio beacons. Generally, such buoys are expendable, short lived, and provide one-way communication. These buoys currently only have as much power as can be afforded (e.g., they use non-renewable battery power), and hence, incorporating energy harvesting technology into these buoys could permit them to have longer operating lifetimes. In the future, buoys will include more sophisticated communications capability, and thus increased power consumption.

For example, research in the area of distributed sensor networks has shown success by using low power computing and fault tolerant distributed wireless communication. However, progress in this area has been slowed by a lack of development in power sources with the potential to keep assets alive for the life of the sensors. The main bottleneck appears to be the small size of the sensor platforms (e.g., many buoys have a diameter of about 8 cm, and a length of about 1.2 m) and the lack of technology to capture renewable sources of power within a small form factor. However, using the P3 platform, a live distributed power grid with a long life can be developed. For example, a large number of integrated P3 buoy nodes 130 could be deployed in an area of interest and networked together to collect information. Thus, the nodes 130 may comprise sensors 132 coupled to a wireless transmitter 134 to receive power generated by the P3.

These distributed networks 100 provide the capability to detect, track, and report on data of interest, depending on the sensor deployed. In the military context, distributed sensor networks 100 can be used to gather information regarding potential threats, such as enemy personnel or vessels, biological or chemical agents, or radioactive fallout. In the commercial context, these sensor networks 100 can be used to monitor environmental conditions, study climate changes, track marine life populations, etc. Thus, embodiments of the invention can provide power for remotely deployed buoy nodes 130 that enable communication among assets deployed both underwater and above the surface.

From a functional perspective, wave energy extraction devices can be categorized as "dynamic" or "passive." In dynamic systems, one element of the system is tuned into excitation by the waves and can be optimized to extract maximum energy through the proper tuning of system characteristics. Most of the popular devices fall in this category; examples include the Cockerell Raft; Salter's Duck; the Bristol cylinder, floating pistons, and platforms; and devices with an oscillating water column. In passive systems, the possibility of tuning is greatly reduced; examples include the TAPCHAN (tapered channel) system, which uses a ramp to guide waves into a reservoir. Such systems are highly site-specific. Some embodiments of the invention use an active system for absorption.

Figure 2:
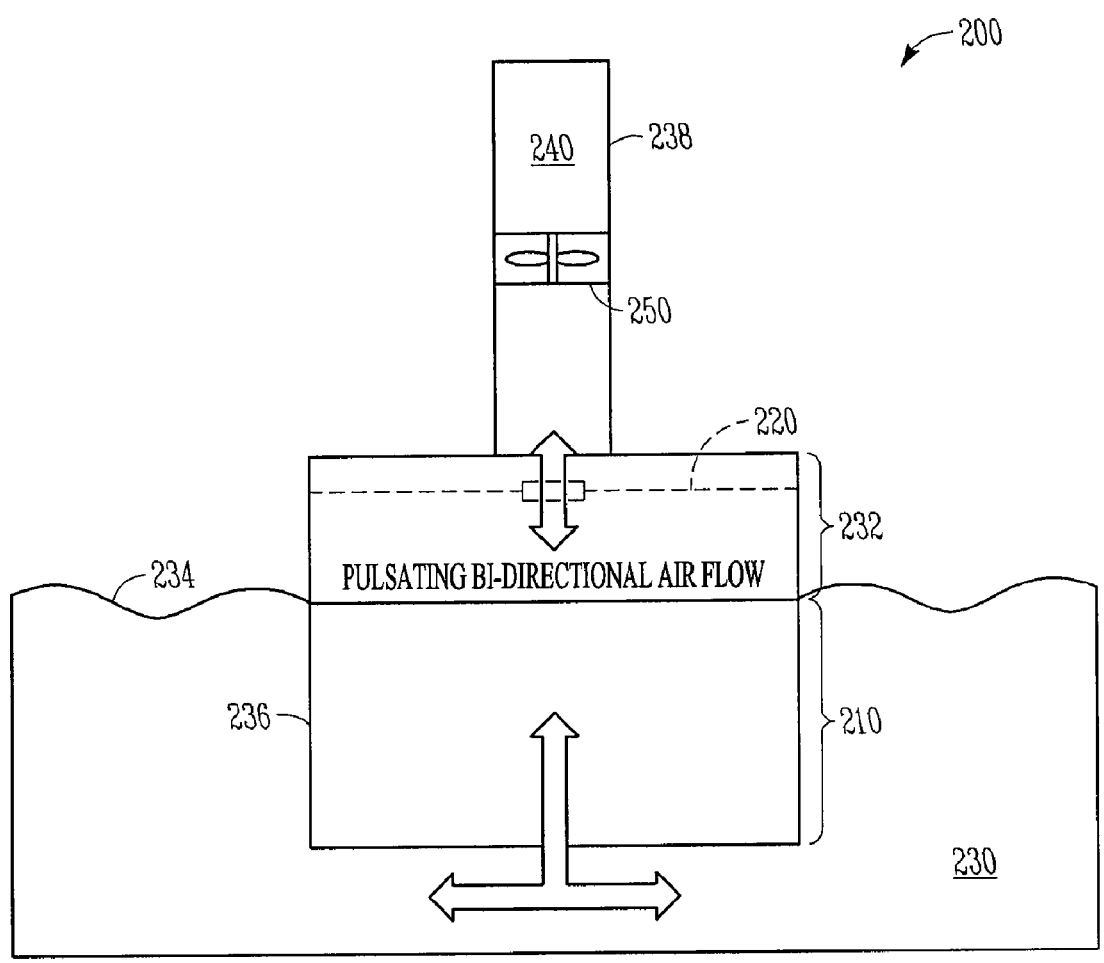
FIG. 2 illustrates a power generation apparatus according to various embodiments of the invention.

FIG. 2 illustrates a power generation apparatus 200 according to various embodiments of the invention. In this figure, the apparatus 200 is shown in simplified conceptual form to aid in understanding fundamental operations.

Some design considerations with respect to extracting wave energy in a practical way include reducing the use of hinges and other components exposed to the sea that are susceptible to corrosion. In addition, moving components under water are difficult to maintain, and trains of adjacent floating devices sometimes require accurate positioning techniques, especially in extreme weather. Further, power is the product of force and velocity. Wave power is associated with large forces at relatively low velocities. Finally, electric power generation is generally more efficient at high velocities, and hence, it can be more efficient to change low velocity wave motion into high speed motion that is suitable for electric power generation.

Various sources have independently confirmed that maintenance has a first order effect on the cost of wave energy produced. For example, it has been estimated that 22% of the total cost of the power produced by the Cockerel Raft wave energy device is consumed by maintenance. Large scale plants are plagued by similar costs. Thus, increasing the maintainability of a wave energy harvesting device can be cost effective.

While it is relatively easy to convert characteristic wave motion to device motion, it appears to be more difficult to generate electricity based on the resulting device motion. Prior attempts make use of an Oscillating Water Column (OWC) 210, without the use of an inertial pump 220, as disclosed herein.

The OWC 210, in simple terms, is an inverted bucket in the ocean 230 with a volume of air 232 trapped on the top of the OWC 210. Waves 234 force the water level in the OWC chamber 236 to oscillate, driving the air 232 above the water through an air nozzle 238. The geometric dimensions of the OWC chamber 236 can be pre-tuned to resonate to the incoming waves, as is well known by those of ordinary skill in the art.

The power in the accelerated pulsating air 240 is absorbed in a bi-directional air turbine 250. The area ratio for this pneumatic gear is typically 100, meaning the velocity of air in the OWC chamber 236, as it passes through the nozzle 238, is increased roughly 100 times. Mechanical gearing systems directed to providing similar advantage ratios are usually impractical with respect to the maintenance required. In various embodiments, the pneumatic gear is coupled to the inertial pump 220.

Figure 3A:
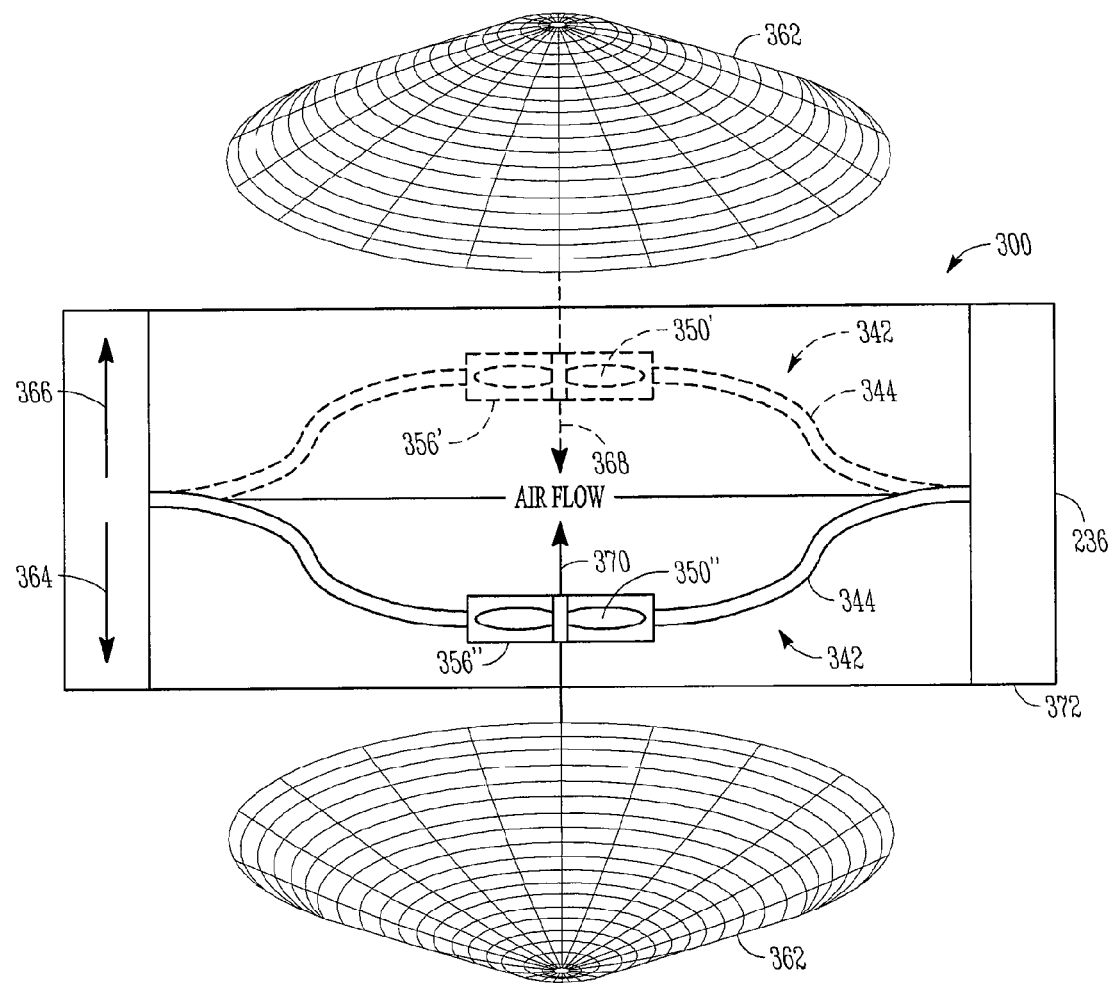
FIGS. 3A-3D illustrate power generation using a power generation apparatus having a turbo-generator forming part of an inertial pump according to various embodiments of the invention.

FIGS. 3A-3D illustrate power generation using a power generation apparatus 300 having a turbo-generator 356 forming part of an inertial pump 342 according to various embodiments of the invention. In FIG. 3A, it can be seen that the pulsating airflow 368, 370 from the inertial pump 342 drives a self-rectifying turbine 350 forming part of the turbo-generator 356. Thus, in some embodiments, the turbo-generator 356 forms a part of the inertial pump 342, which may comprise a membrane 344 made of rubber or some other flexible material. As used herein, the term inertial pump means a pump actuated by an inertial mass.

Figure 4:
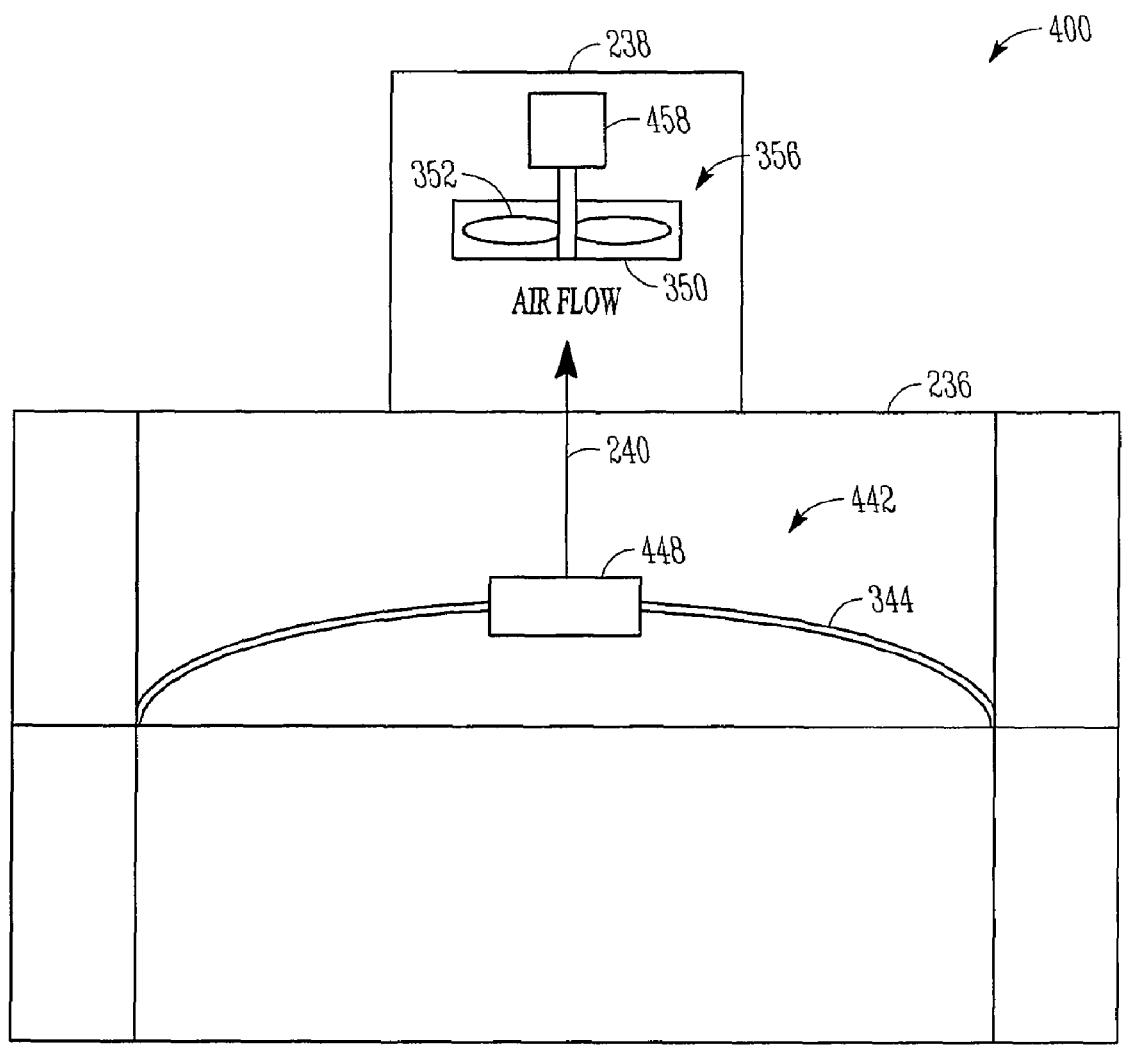
FIG. 4 illustrates a power generation apparatus having a diaphragm pump pneumatically coupled to a turbo-generator according to various embodiments of the invention.

In its simplest form, the concept of an inertial pump 342 includes that of a diaphragm pump (see element 442 in FIG. 4). Whereas the inertial pump 342 shown in FIG. 3A illustrates the power take off turbo-generator 356 providing an active (power-generating) inertial mass by direct attachment to the diaphragm 344, the diaphragm pump has a passive mass (see element 448 in FIG. 4) attached to the diaphragm.

The surfaces 362 shown above and below the inertial pump 342 are the fundamental mode shapes of a circular membrane. The diaphragm 344 stiffness will determine the spring stiffness for the inertial pump 342. The spring mass damper system can be tuned to resonate with the buoy dynamics, enhancing power extraction. However, most embodiments will favor freedom from maintenance over power extraction efficiency. Hence, diaphragm fluctuations may be reduced to control fatigue and violent oscillations. Attaching the turbo-generator 356 to the diaphragm 344 may also help shield the generator 356 from shock loads.

As the buoy moves in the downward direction 364, the diaphragm 344 moves in the upward direction 366, thereby compressing the air above, and driving air 368 through the turbo-generator 356 downward. When the buoy moves in the upward direction 366, the reverse occurs. The airflow 370 direction reverses, so the turbo-generator 356 should be of the self-rectifying type. For example, a pulsating flow, self-rectifying type air turbine called the Wells turbine can be used.

In some embodiments, two inertial pumps 342 may be used. Thus, a first unidirectional turbine 350' may operate to rotate in response to flow in the air in a first direction 368, and a second unidirectional turbine 350" may operate to rotate in response to the flow in the air in a second direction 370. Furthermore, in addition, or alternatively, a secondary fluid flow path 372 coupling the flow of fluid (e.g., air) to the first unidirectional turbine 350' to rotate the first unidirectional turbine 350' in response to the flow in the fluid in a second direction can be implemented. Thus, these designs may use rectifying valves to convert the pulsating bidirectional flow to unidirectional flow. In this way, a unidirectional turbine 350 can be utilized regardless of the direction of air flow (e.g., when air flows in two directions 368, 370).

Figure 3B:
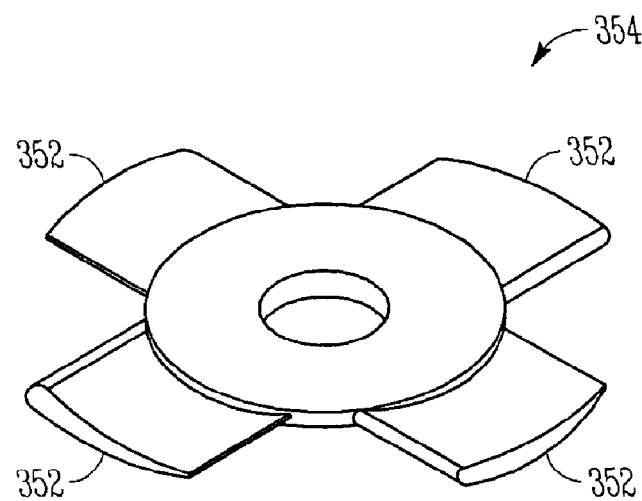
Figure 3C:
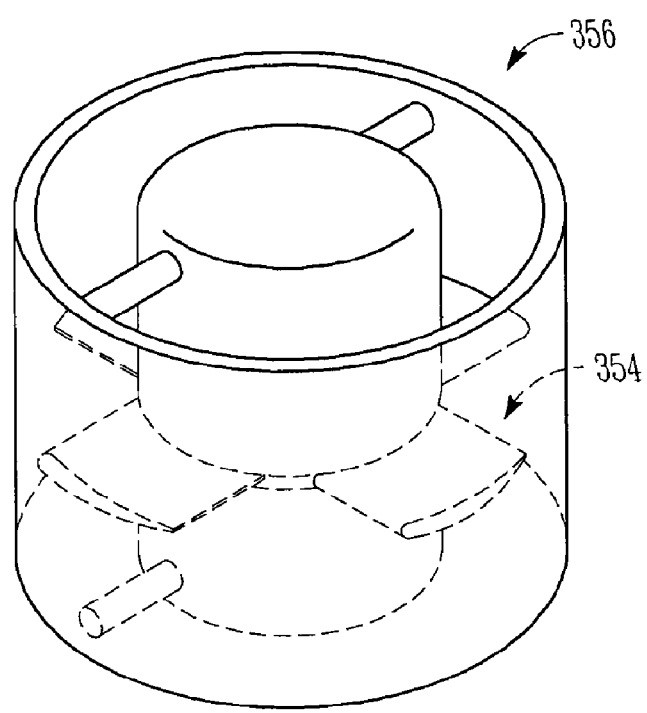
Figure 3D:
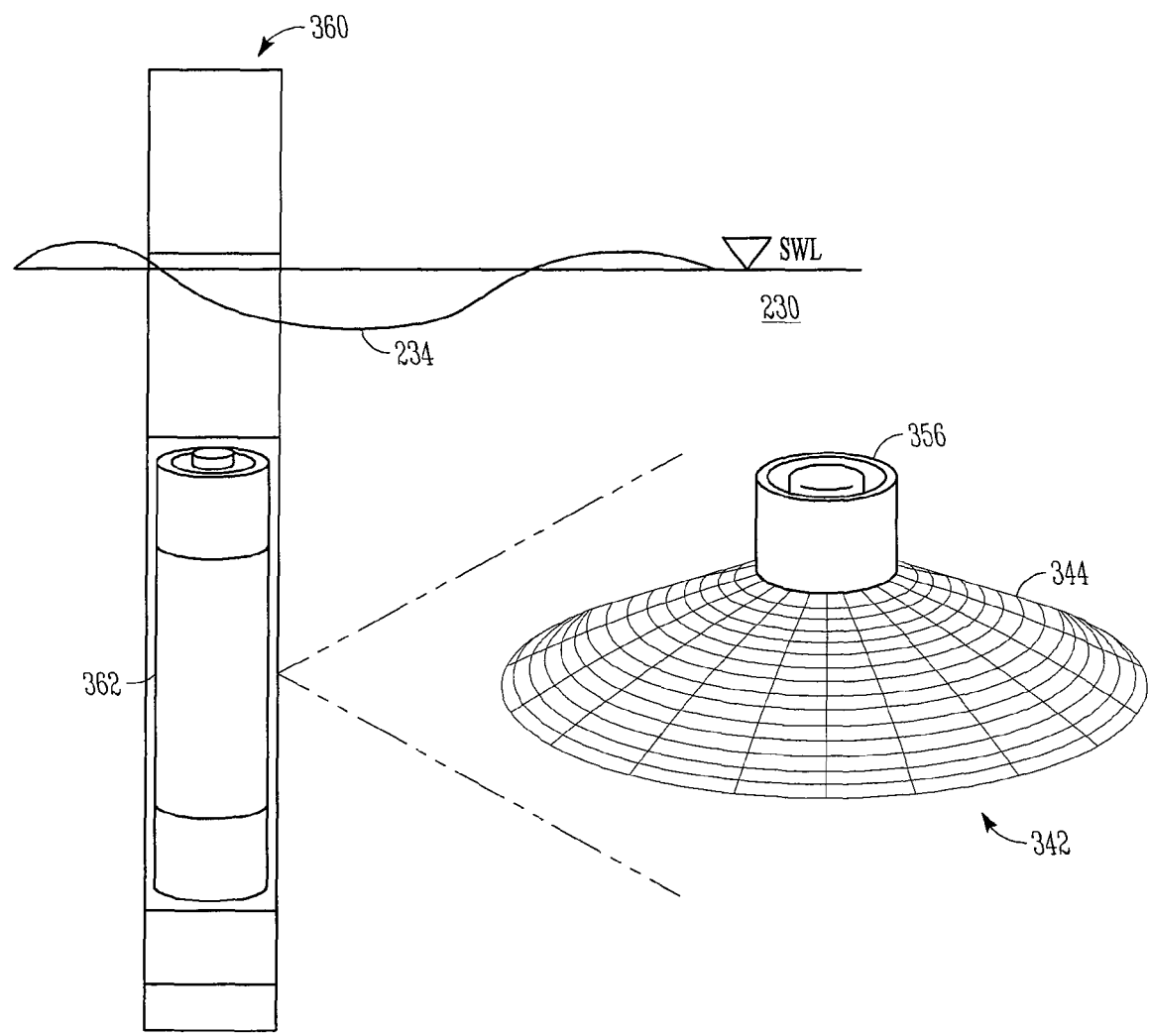

Some embodiments of the turbine 350 use symmetric NACA 0021 profile blades 352, as shown in FIG. 3B, with perhaps four blades 352 used to make up a rotor 354. In FIG. 3C, one possible embodiment of a turbo-generator 356 that makes use of the rotor 354 is shown. In FIG. 3D, a buoy 360 is shown with a conventional battery 362 that can be replaced with the power generation apparatus 300 of FIG. 3A.

FIG. 4 illustrates a power generation apparatus 400 having a diaphragm pump 442 pneumatically coupled to a turbo-generator 356 according to various embodiments of the invention. By making use of a closed inertial element (e.g., the diaphragm pump 442 that has a passive inertial mass 448 attached, instead of a generator 356), some embodiments of the invention operate to shield various components of the generating apparatus 400 from contact with corrosive sea water. This can improve the maintenance life of the apparatus 400, while converting buoy motions to a high speed air flow that drives the turbo-generator 356, comprising the turbine 350 and the generator 458. The turbine 350 may comprise a unidirectional turbine, and the turbine 350 and generator 458 may form an integrated unit.

The diaphragm pump 442 is shown here pneumatically coupled to the turbo-generator 356 for an upward oscillation of the membrane 344. The inertial mass 448 on the membrane 344 of the diaphragm pump 442 can operate to induce differential oscillations, pumping air 240 into the turbine 350. The oscillating membrane 344 produces a pulsating reversible air-flow 240 which, when sent through a self-rectifying turbine 350, causes the turbine blades 352 to rotate in the same direction (whether the membrane 344 moves upwardly, or downwardly).

The diaphragm pump 442 has a membrane 344, which can be fabricated from latex sheets. Standard membrane vibration models, known to those of ordinary skill in the art, can be used to tune the mass and stiffness properties of the membrane 344 to resonate with buoy motion.

Some embodiments of the invention can scale to varying sizes similar to the various sizes of batteries that are available (e.g., about 8 cm in diameter, and about 50 cm long), providing a power output of about 4 mW with a backup storage capacity of about 60 joules. The energy harvested from wave power can be stored in either batteries or electrochemical double layer capacitors (also known as ultracapacitors, such as the Maxwell BOOSTCAP® ultracapacitor available from Maxwell Technologies, Inc. of San Diego, Calif.). Batteries have a higher energy density and lower leakage, while ultracapacitors have a higher storage efficiency and offer higher endurance in terms of charge-discharge cycles. Some embodiments of the invention can also use hybrid systems of ultracapacitors and batteries. The batteries and/or ultracapacitors can be used to supply an energy boost to even out rapid wave fluctuations.

Figure 5:
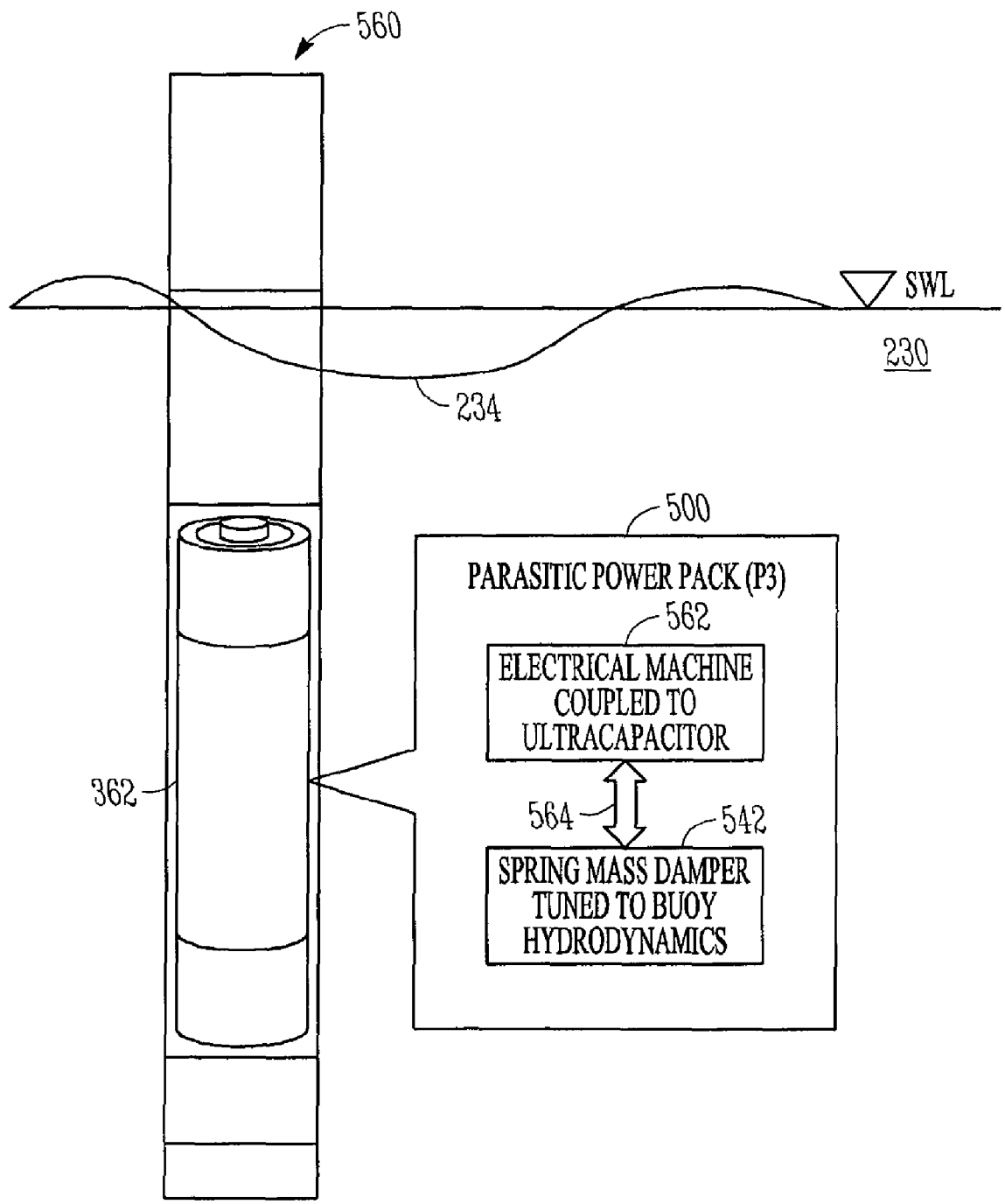
FIG. 5 illustrates a buoy configured to generate power according to various embodiments of the invention.

FIG. 5 illustrates a buoy 560 configured to generate power according to various embodiments of the invention. Here the P3 modular power pack 500 is shown as a substitute for the conventional battery 362 in the buoy 560. The modular design lowers the cost of manufacture and is also relatively maintenance-free. An electrical machine, such as a turbo-generator is coupled to an ultracapacitor to provide an energy production and storage module 562, while a spring mass damper 542 that is tuned to the buoy hydrodynamics can be implemented using an inertial pump.

Figure 6:
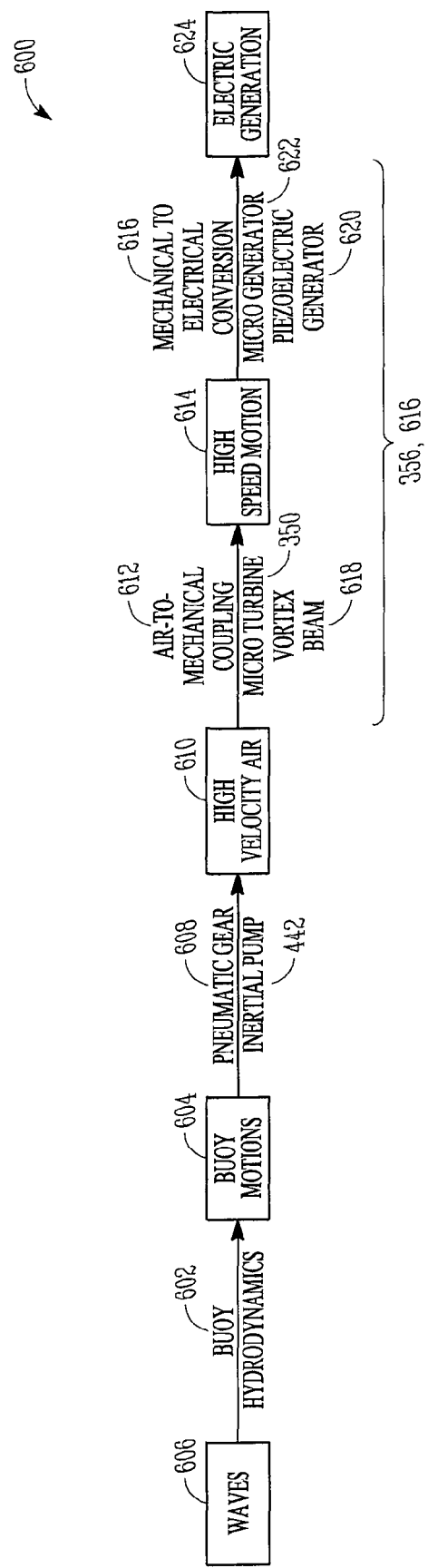
FIG. 6 illustrates a wave energy system chain according to various embodiments of the invention.

FIG. 6 illustrates a wave energy system chain 600 according to various embodiments of the invention. The chain 600 includes several subsystems that can be integrated together to represent the P3 power pack interacting with buoy instrumentation/communication and the buoy structure itself to form the complete system. The components in the chain 600 include the buoy hydrodynamics 602, which can be used to compute the buoy motions 604 in a given wave field 606. The buoy motions 604, in turn, are used as inputs into the next stage of energy conversion, which is the pneumatic gear 608.

As mentioned earlier, buoy motions 604 are slow compared to what is usually envisioned for efficient electric power generation. The pneumatic gear 608 is a relatively efficient device that can be used to accelerate slow OWC wave motions into higher velocities. However, since low maintenance operational characteristics can be useful, the inertial pump 442 can be used to shield various components from direct exposure to water, and coupled to the pneumatic gear 608.

The resulting high velocity air 610 can make use of air-to-mechanical coupling 612 to produce high speed motion 614, which is better suited to efficient electrical power generation.

As an alternative to using the rotating turbo-generator 356 (comprising a turbine 350 and a generator 622) to generate electric power 624, a vortex oscillator 616 or electro-active polymers (EAPs) in the same airflow 610 can be used. The vortex oscillator 616 comprises a vortex-induced vibrating beam 618 coupled to a piezoelectric generator 620. Such solid-state designs may be more robust than using a turbine 350, but will likely produce less power. The vibrating cylindrical beam 618 may be designed to lock-in, such that the frequency of beam oscillation is substantially equal to the frequency of vortex shedding. In this region, larger amplitude oscillations occur, and the piezoelectric device can extract energy out of the fluid flow. The most useful parameters for vortex shedding are the Reynolds number $$Re = \frac{UD}{v} \approx \frac{InertialEffects}{ViscousEffects}$$

and the Strouhal number $$S = \frac{f_s D}{U}$$

where U if the fluid flow velocity, D is the diameter of the cylinder normal to fluid flow, $f_s$ is the vortex shedding frequency, and v the viscosity of the fluid. The mass, stiffness and damping of the system are 'm', 'k,' and 'c' respectively. Whether a turbine 350 or a beam 618 are used, both of the resulting systems can be modeled as a spring mass damper system. Energy extraction will comprise a major component of the damper, along with other frictional losses that occur in the system.

In some embodiments, a number of small power units can be integrated to form a power pack. They can all be electrically connected in a serial-parallel configuration to enhance the redundancy of the design. Thus, the failure of some units will not appreciably affect the overall performance of the power pack.

Thus, many embodiments may be realized. For example, referring now to FIGS. 1-6, it can be seen that an apparatus to harvest wave energy may comprise an inertial pump 342 to generate flow in a fluid (e.g., air) responsive to oscillating motion, a turbine 350 (perhaps unidirectional) to rotate in response to the flow in the fluid, and a generator 458 (perhaps self-rectifying) to generate power in response to rotation of the turbine 350. The inertial pump 342 may comprise a closed flexible membrane 344 having an inertial mass 448. The closed flexible membrane 344 may comprise rubber.

In some embodiments, the apparatus may comprise a second unidirectional turbine 350" to rotate in response to the flow in the fluid in a second direction 370, and a first unidirectional turbine 350' is to rotate in response to fluid flow in a first direction 368. Thus, the second turbine 350" gives redundancy so that power is provided even if one of the turbines (e.g., the first turbine 350') stops operating.

A nozzle can act as a pneumatic gear to accelerate fluid flow. Thus, in some embodiments, the apparatus comprises a constricting nozzle 238 pneumatic gear to couple the inertial pump 442 to the turbine 350. As noted previously, the apparatus may comprise one or more energy storage elements to receive and store the power that is generated by the turbine 350, such as a battery and/or a capacitor (e.g., an ultracapacitor).

Still further embodiments may be realized. For example, a system may comprise a housing having a positive buoyancy with respect to a first fluid (e.g., water). The housing may comprise a ship's hull, a buoy, or a submersible, among others.

The system may further comprise an inertial pump to generate flow in a second fluid (e.g., air trapped in the housing) responsive to wave motion in a first fluid, at least one turbine (perhaps unidirectional) to rotate in response to the flow in the second fluid in a first direction, and a generator to generate power in response to rotation of the turbine.

In some embodiments, the system may comprise a second (e.g., unidirectional) turbine to rotate in response to the flow in the second fluid in a second direction. In addition, or alternatively, the system may comprise a secondary fluid flow path coupling the flow of the second fluid to the first unidirectional turbine to rotate the first unidirectional turbine in response to the flow in the second fluid in a second direction.

The system may further comprise energy storage comprising at least one of a battery and a capacitor to receive and store the power generated by the turbine. The system may also comprise a sensor 132 coupled to a wireless transmitter 134 to receive the power generated by the turbine.

Figure 7:
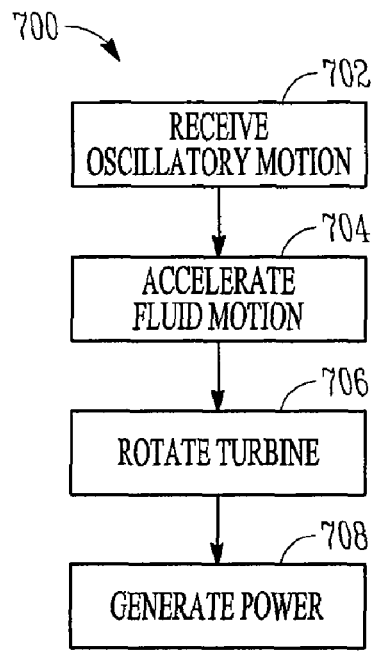
FIG. 7 illustrates a flow diagram according to various embodiments of the invention.

Many other embodiments may be realized, including a number of methods. For example, FIG. 7 illustrates a flow diagram 700 according to various embodiments of the invention. Here it can be seen that a method of harvesting power from fluid motion may comprise receiving oscillatory motion at an inertial mass to impart motion to a fluid, rotating a turbine using the motion imparted to the fluid, and generating power using a generator mechanically coupled to the turbine. The oscillatory motion may be substantially linear (e.g., small amplitude oscillations are typically linear), or substantially nonlinear. The method may further comprise accelerating the motion imparted to the fluid using a constricting nozzle.

Many other embodiments may be realized. Thus, a method may comprise developing a substantially maintenance-free power pack for buoys with built-in energy storage. Another method may comprise developing a modular power add-on to existing buoys that behave hydrodynamically as point absorbers. Yet another method may comprise using an inertial built-in system for a mooring-less buoy. An additional method may comprise using built-in energy storage using pneumatic storage, ultra-capacitors, and batteries to reduce power fluctuations.

Another method may comprise using multiple integrated power units aiding in redundant robust and substantially maintenance-free design. Yet another method may comprise using an inertial pump design to facilitate mass production and cost reduction. Still another method may comprise using a point absorber type design to reduce dependency on wave direction to improve short crested sea performances. An additional method may comprise using an integrated design to reduce total life cycle cost. Another method may comprise using an enclosed protected design to reduce crash damage and provide substantially maintenance-free hull operation.

It should be noted that the methods described herein do not have to be executed in the order described, or in any particular order. Thus, various activities described with respect to the methods identified herein can be executed in repetitive, simultaneous, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment, including hypertext markup language (HTML) and extensible markup language (XML).

Figure 8:
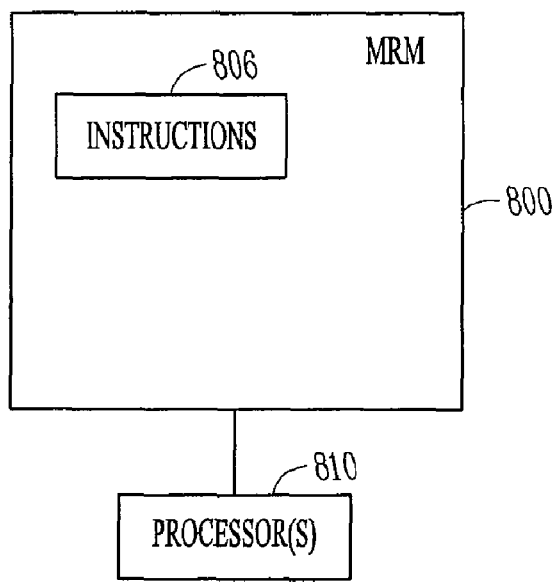
FIG. 8 is a block diagram of an apparatus including a machine-readable medium according to various embodiments of the invention.

Thus, other embodiments may be realized. For example, FIG. 8 is a block diagram of an apparatus including a machine-readable medium (MRM) 800 according to various embodiments of the invention. Examples of such embodiments may comprise a memory system, a magnetic or optical disk, a flash drive, or some other storage device. The MRM 800 may contain instructions 806 which, when accessed, result in one or more processors 810 performing any of the activities previously described, including those discussed with respect to the methods noted above. For example, the MRM 800 may comprise firmware used to simulate the operations described above, or to direct the execution of such operations in association with one or more hosts in a networked data processing and communications environment.

Thus, in some embodiments, a MRM 800 may have instructions 806 stored thereon which, when executed by a computer (e.g., one or more processors(s) 810), cause the computer to perform operations such as receiving oscillatory motion at an inertial mass to impart motion to a fluid, rotating a turbine using the motion imparted to the fluid, and generating power using a generator mechanically coupled to the turbine. Other operations may also be performed.

Implementing the apparatus, systems, and methods according to various embodiments may enable power generation in many instances where such was not previously practical. Most embodiments are adaptable to a variety of use scenarios, and scalable, so that power can be generated in a wide variety of circumstances. Advantages may include easy replacement of battery-powered, untethered buoys; the provision of energy storage components that operate to reduce power fluctuations; and the use of multiple integrated power units to provide redundancy and contribute to a substantially maintenance-free design. Reduced dependency on wave direction, with better short-crested sea performance, as well as reduced total life cycle cost, may result.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for harvesting wave energy, comprising:
a housing having a positive buoyancy with respect to a liquid;
an inertial pump comprising a flexible membrane attached to an inertial mass to generate flow in a fluid responsive to oscillating motion, the inertial pump disposed within the housing;
a first unidirectional turbine to rotate in response to the flow in the fluid sent from the inertial pump; and
a generator to generate power in response to rotation of the turbine.

2. The apparatus of claim 1, wherein the flexible membrane comprises rubber.

3. The apparatus of claim 1, comprising:
a second unidirectional turbine to rotate in response to the flow in the fluid in a second direction, wherein the first unidirectional turbine is to rotate in response to the flow in the fluid in a first direction.

4. The apparatus of claim 1, comprising:
a constricting nozzle pneumatic gear to couple the inertial pump to the unidirectional turbine.

5. The apparatus of claim 1, comprising:
an energy storage element to receive and store the power.

6. The apparatus of claim 5, wherein the energy storage element comprises a battery.

7. The apparatus of claim 5, wherein the energy storage element comprises a capacitor.

8. A system for harvesting wave energy, comprising:
a housing having a positive buoyancy with respect to a first fluid;
an inertial pump comprising a flexible membrane attached to an inertial mass to generate flow in a second fluid responsive to wave motion in the first fluid, the inertial pump disposed within the housing;
a first unidirectional turbine to rotate in response to the flow in the second fluid in a first direction; and
a generator to generate power in response to rotation of the turbine.

9. The system of claim 8, comprising:
a second unidirectional turbine to rotate in response to the flow in the second fluid in a second direction.

10. The system of claim 8, comprising:
a secondary fluid flow path coupling the flow of the second fluid to the first unidirectional turbine to rotate the first unidirectional turbine in response to the flow in the second fluid in a second direction.

11. The system of claim 8, comprising:
energy storage comprising at least one of a battery or a capacitor to receive and store the power.

12. The system of claim 8, wherein the housing comprises a hull of a ship.

13. The system of claim 8, wherein the housing comprises a buoy.

14. The system of claim 8, wherein the housing comprises a submersible vessel.

15. The system of claim 8, comprising:
a sensor coupled to a wireless transmitter to receive the power.

16. The system of claim 8, wherein the unidirectional turbine and the generator form an integrated unit.

17. The system of claim 8, wherein the second fluid comprises air trapped in the housing.

18. A system for harvesting wave energy, comprising:
a housing having a positive buoyancy with respect to a first fluid;
an inertial pump comprising a flexible membrane attached to an inertial mass to generate flow in a second fluid responsive to wave motion in the first fluid, the inertial pump disposed within the housing;
a self-rectifying turbine to rotate in response to the flow in the second fluid in both a first direction and a second direction; and
a generator to generate power in response to rotation of the turbine.

19. The system of claim 18, wherein the housing comprises a buoy.

20. The system of claim 18, wherein the second fluid comprises air trapped in the housing.

21. A system for harvesting wave energy, comprising:
a housing having a positive buoyancy with respect to a first fluid;
an inertial pump with a retentively coupled inertial mass to generate flow in a second fluid responsive to wave motion in the first fluid, the wave motion to induce an oscillating motion of the inertial mass;
a vortex induced vibrating beam to vibrate due to the flow in the second fluid; and
a generator to generate power in response to vibration of the beam.

22. The system of claim 21, wherein the beam comprises an electro-active polymer, and wherein the generator comprises a piezoelectric generator.

23. The system of claim 21, wherein the housing comprises a buoy.

24. A method for harvesting wave energy, comprising:
receiving oscillatory motion at an inertial mass to impart motion to a fluid, the inertial mass attached to a flexible membrane forming part of an inertial pump disposed in a housing having a positive buoyancy with respect to a liquid;
rotating a turbine using the motion imparted to the fluid; and
generating power using a generator mechanically coupled to the turbine.

25. The method of claim 24, wherein the oscillatory motion is substantially linear.

26. The method of claim 24, wherein the oscillatory motion is substantially nonlinear.

27. The method of claim 24, comprising:
accelerating the motion imparted to the fluid using a constricting nozzle.

* * * * *